United States Patent
Maricic et al.

(10) Patent No.: US 10,057,727 B2
(45) Date of Patent: Aug. 21, 2018

(54) INDOOR POSITIONING SYSTEM BASED ON MOTION SENSING AUGMENTED WITH BEACONS

(71) Applicant: General Electric Company, Schenectady, NY (US)

(72) Inventors: Danijel Maricic, Niskayuna, NY (US); Michael James Hartman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 19 days.

(21) Appl. No.: 15/332,896

(22) Filed: Oct. 24, 2016

(65) Prior Publication Data

US 2018/0115876 A1    Apr. 26, 2018

(51) Int. Cl.

| H04W 4/02 | (2018.01) |
| H04W 4/33 | (2018.01) |
| G01S 1/02 | (2010.01) |
| G01S 1/70 | (2006.01) |
| H04B 10/116 | (2013.01) |
| H04W 4/04 | (2009.01) |

(52) U.S. Cl.
CPC ............ *H04W 4/043* (2013.01); *G01S 1/02* (2013.01); *G01S 1/70* (2013.01); *H04B 10/116* (2013.01); *H04W 4/027* (2013.01); *H04W 4/33* (2018.02)

(58) Field of Classification Search
CPC ....... H04W 4/043; H04W 4/027; H04W 4/33; G01S 1/02; G01S 1/70; H04B 10/116
See application file for complete search history.

(56) References Cited

U.S. PATENT DOCUMENTS

| 6,241,364 B1 | 6/2001 | Want et al. |
| 8,232,876 B2 | 7/2012 | Derrick et al. |
| 9,164,178 B2 | 10/2015 | Nichols et al. |
| 2014/0198206 A1 | 7/2014 | Murray |
| 2015/0234477 A1* | 8/2015 | Abovitz ............ G06K 9/00671 382/103 |

(Continued)

FOREIGN PATENT DOCUMENTS

WO    2011055718    12/2011

OTHER PUBLICATIONS

Sturari, et al; Robust and Affordable Retail Customer Profiling by Vision and Radio Beacon Sensor Fusion; Mar. 2, 2016.

(Continued)

*Primary Examiner* — Leslie C Pascal
(74) *Attorney, Agent, or Firm* — GE Global Patent Operation; Nitin Joshi

(57) ABSTRACT

A position tracking system includes one or more beacons and one or more sensor pairs. Each of the one or more sensor pairs is configured to be disposed on equipment that moves within a facility. Each of the one or more sensor pairs includes a motion sensor and a beacon sensor configured to receive signals from the one or more beacons. The position tracking system also include a control system, which include a processor configured to receive a first signal collected by the motion sensor, receive a second signal collected by the beacon sensor, compute a first location and/or orientation based on the first signal, and determine a second location and/or orientation based on the second signal.

16 Claims, 3 Drawing Sheets

(56) References Cited

U.S. PATENT DOCUMENTS

| | | | |
|---|---|---|---|
| 2016/0047890 A1* | 2/2016 | Ryan | G01S 5/16 |
| | | | 398/118 |
| 2016/0077189 A1* | 3/2016 | Elias | G01S 5/0263 |
| | | | 455/456.6 |
| 2016/0119539 A1 | 4/2016 | Tan | |
| 2016/0139243 A1 | 5/2016 | Send et al. | |

OTHER PUBLICATIONS

Durrant-Whyte, et al; The Design of Rada-based Navigation System for Large Outdoor Vehicles; May 21-27, 1955; pp. 764-769; vol. 1, Nagoya.

* cited by examiner

INDOOR POSITIONING SYSTEM BASED ON MOTION SENSING AUGMENTED WITH BEACONS

BACKGROUND

The subject matter disclosed herein relates generally to location tracking, and more particularly, to systems and methods for location tracking based on visible light communication (VLC).

Location tracking or positioning in global positioning system (GPS) denied environments such as indoor facilities and/or crowded areas where signals from the satellite may be shielded by armored building structures, is desirable in many aspects. For example, indoor positioning is of value in industrial and manufacturing facilities, as well as in public venues such as airports and hospitals. Although some forms of indoor positioning are available, they may be limited to short range applications and may be inefficient (e.g., using a great number of tracking devices or densely distributed tracking devices). Accordingly, there is a need for systems and methods that can provide indoor location tracking with enhanced efficiency.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a position tracking system includes one or more beacons and one or more sensor pairs. Each of the one or more sensor pairs is configured to be disposed on equipment that moves within a facility. Each of the one or more sensor pairs includes a motion sensor and a beacon sensor configured to receive signals from the one or more beacons. The position tracking system also include a control system, which include a processor configured to receive a first signal collected by the motion sensor, receive a second signal collected by the beacon sensor, compute a first location and/or orientation based on the first signal, and determine a second location and/or orientation based on the second signal.

In another embodiment, a position tracking system includes one or more beacons disposed within a facility, and one or more sensor pairs. Each of the one or more sensor pairs is disposed on equipment that moves within the facility. Each of the one or more sensor pairs includes a motion sensor and a beacon sensor configured to receive signals from the one or more beacons. The position tracking system also includes a control system. The control system includes a memory and a processor configured to execute instructions stored on the memory. The instructions include instructions for receiving a first signal collected by the motion sensor, receiving a second signal collected by the beacon sensor, computing a first location and/or orientation based on the first signal, and determining a second location and/or orientation based on the second signal.

In another embodiment, a method for providing positioning of equipment includes receiving a first signal collected by a motion sensor coupled to the equipment. The method includes receiving a second signal collected by a beacon sensor coupled to the equipment, wherein the second signal is collected when the beacon sensor is within a field-of-view of a beacon. The method includes computing a first location based on the first signal and determining a second location based on the second signal. The method also includes calibrating the computed first location based on the determined second location.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
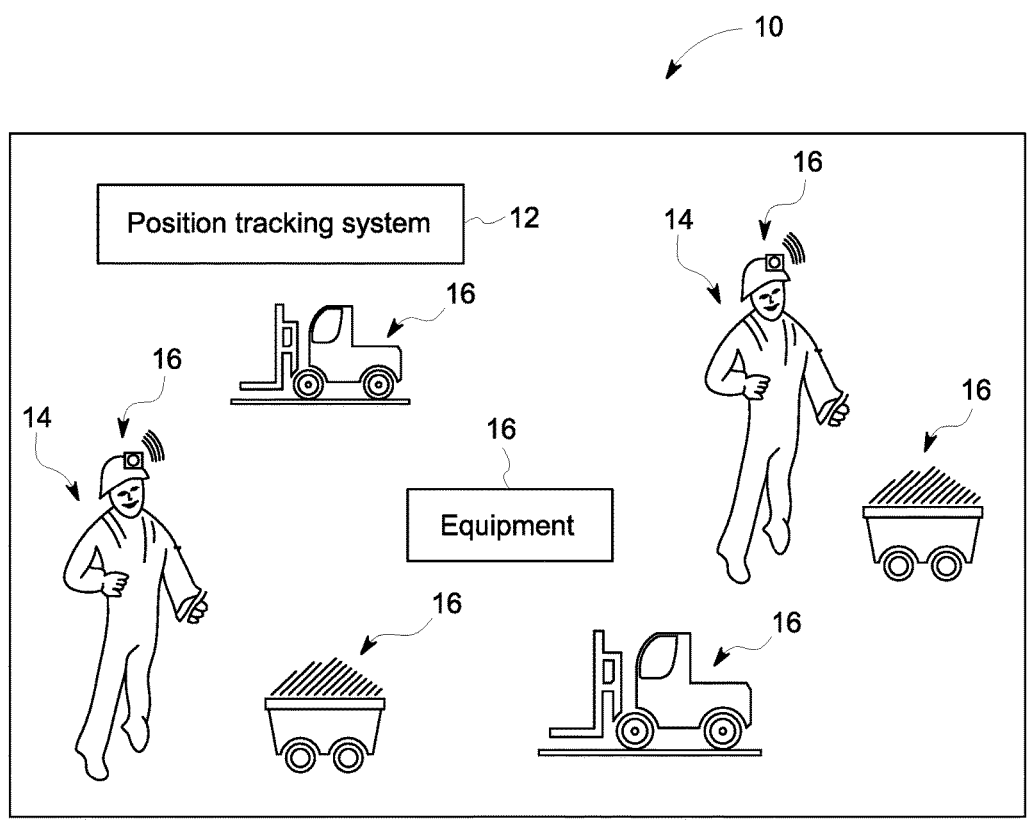
FIG. 1 is an example diagram of an indoor facility having a position tracking system, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to a position tracking system that provides the locations and/or orientations of equipment (e.g., vehicles, electronic devices, tools, devices configured to be worn by a person, and so forth) as the equipment moves or travels within in an indoor or GPS denied facility. The position tracking system may include sparsely distributed location beacons in the facility, and a pair of a beacon sensor and a motion sensor disposed on or coupled to the equipment being tracked, where the location beacons and the beacon sensor may communicate based on principles of visible light communication (VLC). It should be noted that the term disposed on or coupled to may refer to being fixed via an adhesive (e.g., glue, adhesive layer), via an applied force (e.g., force applied by an user, gravitational force), or via any other suitable fixing or integrating mechanisms (e.g., a fixture, a snap fit, an interference fit, bolt and screw, hook-and-loop). The position tracking system may determine the locations and/or orientations of the equipment using the information collected by the motion sensors and/or using the information collected by the beacon sensors. In addition, as the equipment frequently travels near a location beacon (e.g., within a receiving field-of-view), the position tracking system may use the information collected by the beacon sensors to calibrate motion sensor errors, drift errors, etc. Because of the frequent calibrations, the motion sensors may consistently provide accurate and precise location/orientation information, and the total number of location beacons may be reduced (e.g., sparsely distributed). For example, the position tracking system may rely on the motion sensors to compute the locations and/or orientations of the equipment when the equipment travels where no location beacon is available.

With the foregoing mind, it may be useful to describe an embodiment of an indoor facility 10 that may employ an indoor position tracking system 12, as depicted in FIG. 1. The indoor facility 10 may be a mine (e.g., a coal mine, a metals mine, an oil shale mine, or other natural resources that may be mined), an industrial environment (e.g., a power generation plant, a chemical production plant, a petroleum refinery, a manufacturing facility, a building construction site, and so forth), a medical environment (e.g., a hospital, a magnetic resonance imaging lab), a facility for construction applications (e.g., new building construction, building repairs), and for other similar industrial and/or commercial applications.

As further depicted in FIG. 1, the indoor facility 10 may include the position tracking system 12 to track locations of one or more personnel 14 and/or one or more pieces of equipment 16 within the indoor facility 10. For example, the personnel 14 may include one or more miners, engineers, field technicians, supervisors, contractors, emergency and safety teams, etc. For example, the one or more pieces of equipment 16 may include one or more vehicles, carts, mining machines, and equipment or objects that may move or travel around in the indoor facility 10. For example, the one or more pieces of equipment 16 may include one or more devices and tools that may be worn or carried by the one or more personnel 14 (e.g., electronic devices, handheld tools, handheld devices, wearable equipment/devices such as hardhats and headlamp assemblies) and other equipment that may be useful in operating the indoor facility 10.

Figure 2:
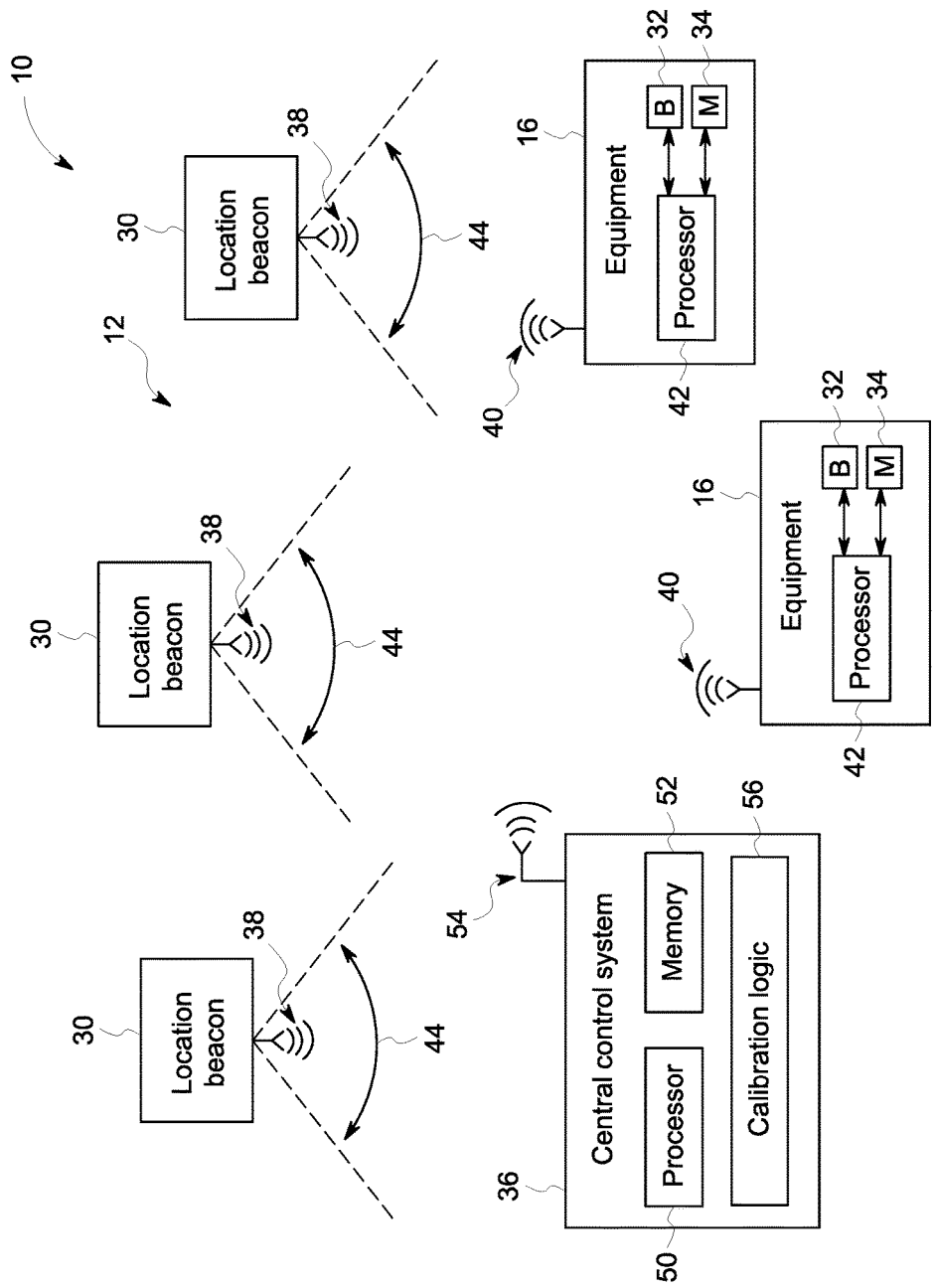
FIG. 2 is a block diagram of the position tracking system of FIG. 1, in accordance with an aspect of the present disclosure.

Turning now to FIG. 2, a block diagram of the position tracking system 12 for tracking the one or more personnel 14 and/or the one or more pieces of equipment 16 moving in the indoor facility 10 is depicted. In the illustrated embodiment, the position tracking system 12 may include one or more location beacons 30 (e.g., light beacons, infrared (IR) beacons, radio frequency (RF) beacons), one or more beacon sensors 32 (e.g., visible light sensors, IR sensors, RF receivers, cameras) and one or more motion sensors 34 (e.g., inertial measurement units (IMUs), accelerometers) disposed on the one or more pieces of equipment 16 (e.g., a pair of a beacon sensor 32 and a motion sensor 34 disposed on each of the pieces of equipment 16 being tracked). In one embodiment, the one or more beacon sensors 32 and the one or more motion sensors 34 may be integrated with the respective pieces of equipment 16 and may be powered through the electrical supplies of the respective pieces of equipment 16. In another embodiment, the one or more beacon sensors 32 and the one or more motion sensors 34 may be powered by energy storage devices (e.g., batteries).

The position tracking system 12 may include a central control system 36 communicatively and/or operatively coupled to the one or more location beacons 30, to the one or more beacon sensors 32, and to the one or more motion sensors 34. As set forth above, the locations and/or orientations of the one or more personnel 14 may be tracked by tracking the locations and/or orientations of the one or more pieces of equipment 16 worn or carried by the one or more personnel 14 as the one or more personnel 14 maneuver in the indoor facility 10. For example, a location and/or orientation of a person may be tracked by locating a hardhat, a headlamp assembly, or a device worn by the person, or by locating a hand tool or other pieces of equipment carried by the person.

The one or more location beacons 30 may be disposed within the indoor facility 10. For example, the one or more location beacons 30 may be mounted on structures or frames such as a ceiling, light fixtures, poles, gates, entrances/exits, or any other suitable structures within the indoor facility 10. In one embodiment, the one or more location beacons 30 may be integrated with the structures or frames (e.g., a ceiling, light fixtures, poles, gates, entrances/exits) and may be powered through electrical supplies or grids of the structures or frames (e.g., electrical wiring in a ceiling, light fixtures, electrical poles, and so forth). In another embodiment, the one or more location beacons 30 may be powered with energy storage devices (e.g., batteries).

The one or more location beacons 30 may each include a transceiver 38 (e.g., a VLC transceiver, a RF transceiver, or other low-power transceiver). The transceivers 38 may allow each of the location beacons 30 to wirelessly communicate data with each of the other location beacons 30, to wirelessly communicate data with each of the pieces of equipment 16, and/or to wirelessly communicate data with the central control system 36. Alternatively, the one or more location beacons 30 may be integrated into light sources or light fixtures having VLC capabilities to allow each of the light sources (e.g., the location beacons 30) to wirelessly communicate data with each of the other light sources (e.g., the location beacons 30), to wirelessly communicate data with each of the pieces of equipment 16, and/or to wirelessly communicate data with the central control system 36. The light sources may be visible or IR light-emitting diodes (LEDs) lamps, LED lighting systems. It may be appreciated that LEDs can be switched on and off fast enough for flicker free communication.

The one or more pieces of equipment 16 may each include the beacon sensor 32 (e.g., a visible light sensor, an IR sensor, a RF receiver, a camera), the motion sensor 34 (e.g., an IMU, an accelerometer), a transceiver 40 (e.g., a VLC transceiver, a RF transceiver, or other low-power transceiver), and a processor 42 communicatively and/or operatively coupled to the beacon sensor 32, to the motion sensor 34, and to the transceiver 40. The processor 42 may be operatively coupled to a memory device to execute instructions for carrying out the presently disclosed techniques. These instructions may be encoded in programs or code stored in a tangible non-transitory computer-readable medium, such as a memory and/or other storage. The processor 42 may be a general-purpose processor, system-on-chip (SoC) device, an application-specific integrated circuit (ASIC), or some other similar processor configuration.

The motion sensors 34 may continuously collect data (e.g., position, velocity, acceleration, etc.) for computing the locations and/or orientations of the one or more pieces of equipment 16, and the collected data may be transmitted by the transceivers 40 to the central control system 36. Such transmissions may occur continuously, occur upon receiving instruction(s) from the processors 42, or occur in any suitable intervals (e.g., seconds, minutes). Upon receiving these transmissions, the central control system 36 may compute the locations and/or orientations of the respective equipment 16 based on these transmissions. Alternatively, the computation of the locations and/or orientations may take place on site (e.g., computed by the processors 42), and the collected data and/or computed locations and/or orientations may be transmitted by the transceivers 40 to the central control system 36.

The one or more location beacons 30 may transmit their identities and/or coordinates (e.g., location coordinates), and as the equipment 16 comes into a receiving field-of-view 44 of the respective location beacon 30, the beacon sensor 32 on the equipment 16 may receive these transmissions. Subsequently or upon receiving instruction(s) from the processor 42, the transceiver 40 may transmit these transmissions received by the beacon sensor 32 to the central control system 36. The central control system 36 may determine the locations and/or orientations of the equipment 16 based on these transmissions.

The central control system 36 may include a processor 50, a memory 52 communicatively coupled to the processor 50, a transceiver 54 communicatively and operatively coupled to the processor 50, and a calibration logic 56 stored in the memory 52. The processor 50 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The transceiver 54 may be a VLC transceiver, a RF transceiver, or other low-power transceiver to allow the central control system 36 to wirelessly communicate data with the one or more location beacons 30 and with the one or more pieces of equipment 16.

The memory 52 (e.g., a non-transitory computer-readable medium/memory circuitry) may include volatile memory, such as random access memory (RAM), and/or non-volatile memory, such as read-only memory (ROM), optical drives, hard disc drives, or solid-state drives. The memory 52 may store data or information and one or more sets of instructions (e.g., processor-executable instructions) implemented to perform operations related to the position tracking system 12. For example, the memory 52 may store a map or layout of the indoor facility 10 (e.g., including coordinates or locations of the one or more location beacons 30). For example, the memory 52 may store instructions to obtain information (e.g., information related to locations and/or orientations of the one or more pieces of equipment 16 and/or personnel 14) from various components of the position tracking system 12, and store the obtained information in the memory 52. The information may be data collected and/or computed via the one or more beacon sensors 32 and via the one or more motion sensors 34 (e.g., communicated through the transceivers). For example, the memory 52 may store algorithms to compute or determine locations and/or orientations of the respective equipment 16 based on the data collected via the beacon sensors 32 and/or via the motion sensors 34.

Further, the memory 52 may store code encoding executable algorithms and logic such as the calibration logic 56, which is accessed and operated according to the processor 50 instructions. In one embodiment, the calibration logic 56, when executed and provided with the collected information from the beacon sensors 32, may determine locations and/or orientations of the respective equipment 16. In one embodiment, the calibration logic 56, when executed and provided with the collected information from the motion sensors 34, may compute locations and/or orientations of the respective equipment 16.

In one embodiment, the calibration logic 56, when executed and provided with the collected information from the beacon sensors 32 and the collected or computed information from the motion sensors 34, may determine locations and/or orientations of the respective equipment 16 and subsequently calibrate the motion sensors 34 based on the determined locations and/or orientations of the respective equipment 16. For example, the calibration logic 56 may determine a difference between the determined location and/or orientation (e.g., based on information obtained by the beacon sensor 32) and the computed location and/or orientation (e.g., based on information obtained by the motion sensor 34), and based on the difference, calibrate the motion sensor 34 such that the computed and determined locations/orientations match approximately to one another.

In another embodiment, such calibration is not limited to calibration of the results computed by the motion sensors 34 (e.g., positions and/or orientations), and the calibration logic 56 may be executed to calibrate various motion sensor errors. For example, calibration of the motion sensor 34 may include calibrating motion sensor errors such as any measurement errors, measurement errors that grow over time, errors associated with repeatability (e.g., the ability of a sensor to deliver the same output for the same repeated input), errors associated with stability (e.g., the ability of a sensor to deliver the same output, over time, for the same constant input), errors associated with drift (e.g., a change of the output over time), etc.

Each of the motion sensors 34 may be calibrated every time the respective equipment 16 and the beacon sensor 32 disposed thereon come into a receiving field-of-view 44 of the respective location beacon 30. As such, the motion sensors 34 may be calibrated frequently and may consistently provide more accurate and precise results (e.g., as compared to a motion sensor that is not frequently calibrated). As a result, both the beacon communication (e.g., the location beacons 30 and the beacon sensors 32) and the motion sensors 34 may be relied on for determining locations and/or orientations of the respective equipment 16, and the number of the location beacons 30 may be reduced (e.g., the location beacons 30 are distributed sparsely rather than densely). For example, the position tracking system 12 may rely on the motion sensor 34 to compute the locations and/or orientations of the equipment 16 when the equipment 16 travels where no location beacon 30 is available (e.g., the equipment 16 is between location beacons 30). For example, errors associated with motion sensor drift may need to be calibrated every few minutes (e.g., every 1, 2, 3, 4, 5, 6, 7, 8, 9, or 10 minutes) before errors accumulate. Typically, the motion sensor 34 (e.g., accelerometers, IMUs) may track motions and/or orientations for a few minutes (e.g., 1, 2, 3, 4, 5, 6, 7, 8, 9, or 10 minutes) as the equipment 16 moves within the indoor facility 10 before sensor calibration or correction is required. It may be appreciated that, the location beacons 30 may be distributed sparsely to minimize motion sensor errors based on the allowable period between calibrations and/or based on allowable travel/motion distance between calibrations. As such, the location beacons 30 may be distributed sparsely so that the equipment 16 may travel or move for several minutes (e.g., 1, 2, 3, 4, 5, 6, 7, 8, 9, or 10 minutes) before any calibrations are required.

It may also be appreciated that information or data in the position tracking system 12 may be transmitted (e.g., via the transceiver 54) to the authorized one or more personnel 14. The authorized one or more personnel 14 may also have access to the central control system 36 to obtain the information or data. It should be noted that the information or data may include any information or data collected, computed, or determined by the position tracking system 12 including the locations and/or orientations determined by the position tracking system 12, the transmitted data from the beacon sensors 32 and from the motion sensors 34, and the calibration data, etc. In one embodiment, the central control system 36 may locate in the indoor facility 10. In another embodiment, the central control system 36 may be a remote service platform (e.g., cloud service). In another embodiment the central control system 36 may locate on the one or more pieces of equipment 16. For example, a moving object may hold the equipment 16 (e.g., including the motion sensor 34, the beacon sensor 32 such as a camera, the central control system 36) pointing towards the location beacons 30 and the calibration logic 56 may calibrate the motion sensor 34.

Figure 3:
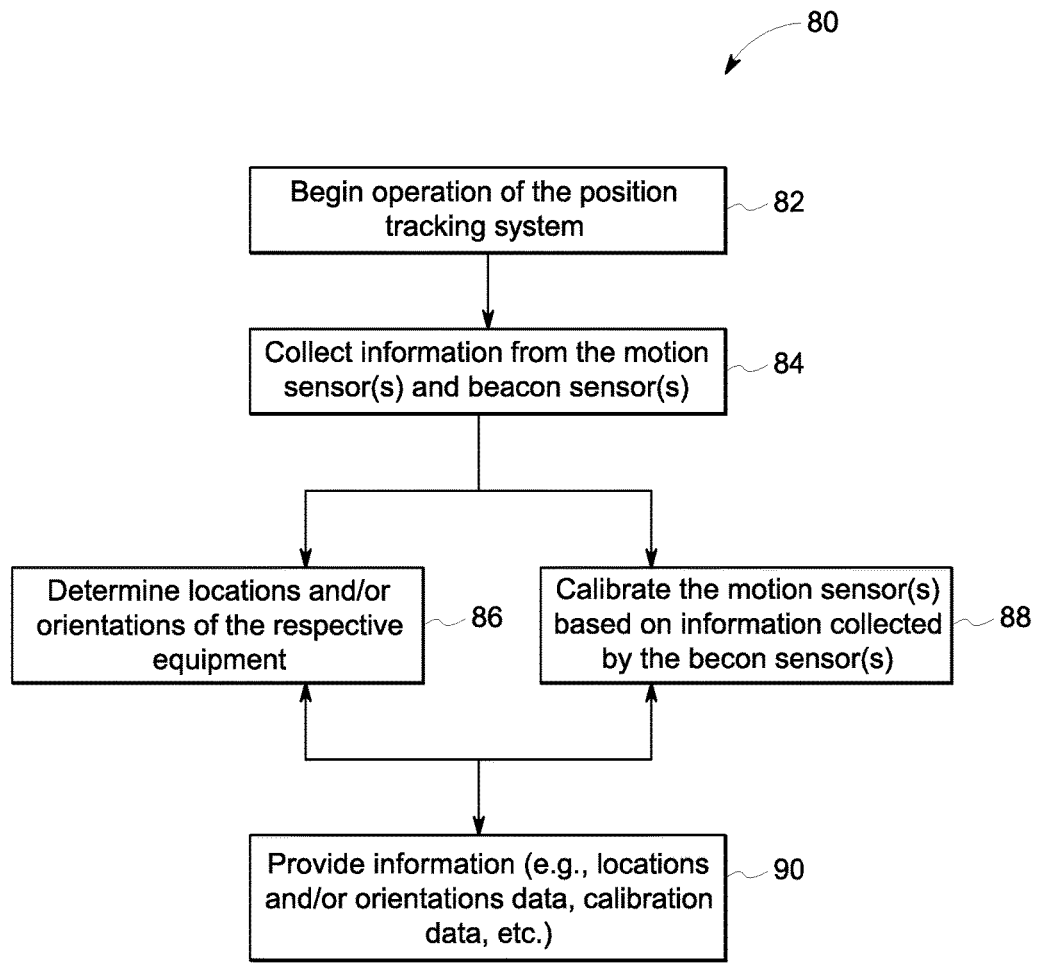
FIG. 3 is a flow chart illustrating a process for utilizing the position tracking system to provide indoor location tracking using a reduced number of location beacons, in accordance with an aspect of the present disclosure.

FIG. 3 is a flow chart illustrating a process 80 for utilizing the position tracking system 12 to provide indoor location tracking using a reduced number of the location beacons 30, in accordance with an aspect of the present disclosure. One or more of steps of the process 80 may be executed by the processor 50 of the central control system 36 and the processor 42 of the one or more pieces of equipment 16. The process 80 includes beginning operation of the position tracking system 12 (step 82). The operation of the position tracking system 12 may begin upon presence(s) of movements of the one or more pieces of equipment 16 and/or the one or more personnel 14 in the indoor facility 10. For example, the position tracking system 12 may be activated (e.g., all components and/or systems of the position tracking system 12 are turned on and ready to collect, receive, process, and transmit data) when the one or more personnel 14 and/or the one or more pieces of equipment 16 enter or maneuver the indoor facility 10. Alternatively, the position tracking system 12 may be activated (e.g., via a control signal) and stay activated till deactivation.

The process 80 includes collecting information from the motion sensors 34 and the beacon sensors 32 (step 84) and determining locations and/or orientations of the respective equipment (step 86). The central control system 36 may continuously or in any suitable intervals (e.g., seconds, minutes) collect information or data from the motion sensors 34. The central control system 36 may collect information or data from the beacon sensors 32 every time the one or more pieces of equipment 16 come close to location beacons 30 (e.g., come into the location beacon's receiving field-of-view 44). Based on the information or data collected by the motion sensors 34, the locations and/or orientations of the respective equipment 16 may be determined (e.g., computed) by the processor 50 of the central control system 36. Alternatively, such computing step may be performed by the processor 42 of the equipment 16, and the computed locations and/or orientations of the respective equipment 16 may be transmitted to the central control system 36.

The process 80 also includes calibrating the motion sensors 34 based on information collected by the beacon sensors 32 (step 88). The central control system 36 may collect information or data (e.g., locations and/or orientations) from the beacon sensor 32 every time the equipment 16 comes close to location beacons 30 (e.g., comes into the location beacon's receiving field-of-view 44), such that the motion sensors 34 may be calibrated via the calibration logic 56 based on the information or data collected by the beacon sensors 32. As set forth above, such calibration is not limited to calibration of the results (e.g., location and/or orientation), and calibration of the motion sensors 34 may include calibrating various motion sensor errors.

The process 80 also includes providing information (e.g., locations and/or orientations data, calibration data, etc.) (step 90). It should be noted that providing information (step 90) may include transmitting (e.g., via the transceiver 54) information or data collected or determined by the position tracking system 12 to the authorized one or more personnel 14. Alternatively, providing information (step 90) may include the authorized one or more personnel 14 accessing the central control system 36 to obtain the information or data. It should be noted that the information or data may include any information or data collected, determined, or computed by the position tracking system 12 including the locations and/or orientations determined by the position tracking system 12, the transmitted data from the beacon sensors 32 and from the motion sensors 34, and the calibration data, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A position tracking system, comprising:
   one or more beacons;
   one or more sensor pairs, wherein each of the one or more sensor pairs is configured to be disposed on equipment that moves within a facility, and wherein each of the one or more sensor pairs comprises a motion sensor and a beacon sensor configured to receive signals from the one or more beacons; and
   a control system, comprising a processor configured to:
   receive a first signal collected by the motion sensor;
   receive a second signal collected by the beacon sensor;
   compute a first location of the equipment based on the first signal;
   determine a second location of the equipment based on the second signal;
   calibrate the motion sensor based on the determined second location; and
   wherein one or more beacons transmit their location coordinates via a transmitter to the beacon sensor as the equipment comes into a receiving field-of-view of the respective beacon and the second signal received by the processor includes the location coordinates.

2. The position tracking system of claim 1, wherein the one or more beacons each emits modulated visible light.

3. The position tracking system of claim 1, wherein the one or more beacons and the beacon sensor of each sensor pair communicate based on visible light communication (VLC).

4. The position tracking system of claim 1, wherein the facility is a global positioning system (GPS) denied environment or an indoor environment.

5. The position tracking system of claim 1, wherein the control system is integrated with the equipment that moves within the facility.

6. The position tracking system of claim 1, wherein the motion sensor comprises an inertial measurement unit (IMU) or accelerometer.

7. The position tracking system of claim 1, wherein the beacon sensor comprises a visible light sensor, an infrared (IR) sensor, or a radio frequency (RF) sensor.

8. The position tracking system of claim 1, wherein the processor is configured to calibrate the motion sensor every time the equipment comes into the receiving field-of-view of the respective beacon.

9. The position tracking system of claim 1, wherein the processor is configured to determine a difference between the first location and the second location and calibrate the motion sensor based on the difference between the first location and the second location.

10. A position tracking system, comprising:
one or more beacons disposed within a facility;
one or more sensor pairs, wherein each of the one or more sensor pairs is disposed on equipment that moves within the facility, and wherein each of the one or more sensor pairs comprises a motion sensor and a beacon sensor configured to receive signals from the one or more beacons; and
a control system, comprising:
a memory; and
a processor configured to execute instructions stored on the memory comprising instructions for:
receiving a first signal collected by the motion sensor;
receiving a second signal collected by the beacon sensor;
computing a first location of the equipment based on the first signal;
determining a second location of the equipment based on the second signal;
calibrating the motion sensor based on the determined second location; and
wherein one or more beacons transmit their location coordinates via a transmitter to the beacon sensor as the equipment comes into a receiving field-of-view of the respective beacon and the second signal received by the processor includes the location coordinates.

11. The position tracking system of claim 10, wherein the one or more beacons and the beacon sensor of the each sensor pair communicate based on visible light communication (VLC).

12. The position tracking system of claim 10, wherein the control system is integrated with the equipment that moves within the facility.

13. The position tracking system of claim 10, wherein the motion sensor comprises an inertial measurement unit (IMU) or accelerometer.

14. The position tracking system of claim 10, wherein the beacon sensor comprises a visible light sensor, an infrared (IR) sensor, or a radio frequency (RF) sensor.

15. A method for providing positioning of equipment comprising:
receiving a first signal collected by a motion sensor coupled to the equipment;
receiving a second signal collected by a beacon sensor coupled to the equipment, wherein the second signal is collected when the beacon sensor is within a field-of-view of a beacon and the second signal includes location coordinate of the respective beacon transmitted by a transmitter of the beacon;
computing a first location of the equipment based on the first signal;
determining a second location of the equipment based on the second signal;
calibrating the motion sensor based on the determined second location.

16. The method of claim 15, wherein the beacon and the beacon sensor communicate based on visible light communication (VLC).

* * * * *